United States Patent [19]

Kirtland

[11] Patent Number: 4,988,838
[45] Date of Patent: Jan. 29, 1991

[54] LINE PROTECTING APPARATUS

[75] Inventor: Dennis A. Kirtland, Ashby-de-la-Zouch, United Kingdom

[73] Assignee: W. H Dunn & Son Limited, Leicestershire, England

[21] Appl. No.: 276,291

[22] Filed: Nov. 17, 1988

[30] Foreign Application Priority Data

Jan. 26, 1988 [GB] United Kingdom ............... 8801707

[51] Int. Cl.$^5$ .................................................. F16L 3/08
[52] U.S. Cl. ............................... 191/12 C; 24/115 J; 59/78.1; 248/51
[58] Field of Search ................ 191/12 R, 12 C; 24/20 R, 115 J; 248/49, 51; 59/78.1; 174/69

[56] References Cited

U.S. PATENT DOCUMENTS

| 3,891,294 | 6/1975 | Philbert | 24/20 R |
| 4,186,553 | 2/1980 | Fitchett | 248/49 X |
| 4,600,817 | 7/1986 | Hackenberg | 191/12 C |

FOREIGN PATENT DOCUMENTS

| 0088203 | 1/1983 | European Pat. Off. |  |
| 0192852 | 9/1986 | European Pat. Off. | 59/78.1 |
| 0251252 | 6/1987 | European Pat. Off. |  |
| 0230553 | 8/1987 | European Pat. Off. |  |
| 0661118 | 5/1979 | U.S.S.R. | 248/49 |
| 1431382 | 4/1976 | United Kingdom |  |
| 1542921 | 7/1977 | United Kingdom |  |
| 2054089 | 2/1981 | United Kingdom |  |
| 2070344 | 9/1981 | United Kingdom |  |
| 1602464 | 11/1981 | United Kingdom |  |
| 2098699 | 11/1982 | United Kingdom | 248/49 |
| 2120464 | 11/1983 | United Kingdom |  |
| 2129466 | 5/1984 | United Kingdom |  |
| 2137305 | 10/1984 | United Kingdom |  |
| 8101307 | 5/1981 | World Int. Prop. O. |  |

OTHER PUBLICATIONS

"Plastic Support Chain for Cables and Conduits", Murrelektronik Ltd., 11-1986.

Primary Examiner—Andres Kashnikow
Attorney, Agent, or Firm—Watts, Hoffmann Fisher & Heinke

[57] ABSTRACT

For protecting cables, service lines and the like particularly in longwall face mining, an articulated arrangement is formed from a plurality of interconnected links. Each link has a central web (10) forming the common base for a pair of laterally open channels (16,18) on respective sides. At least some of the links have each channel side (12,14) formed with an inwardly extending bulge (28) which thereby define an entrance (30,32) for the respective channel of less width than the width of the respective channel. The apparatus is substantially formed of a plastics material with the channel sides being resiliently flexible whereby a cable or service line can be inserted into a respective one of the channels (16,18) by deflecting the channel legs apart. After the cable or service line passes through the channel entrance, the channel sides (12,14) regain their original position and prevent the line from moving inadvertently out of the channel.

28 Claims, 3 Drawing Sheets

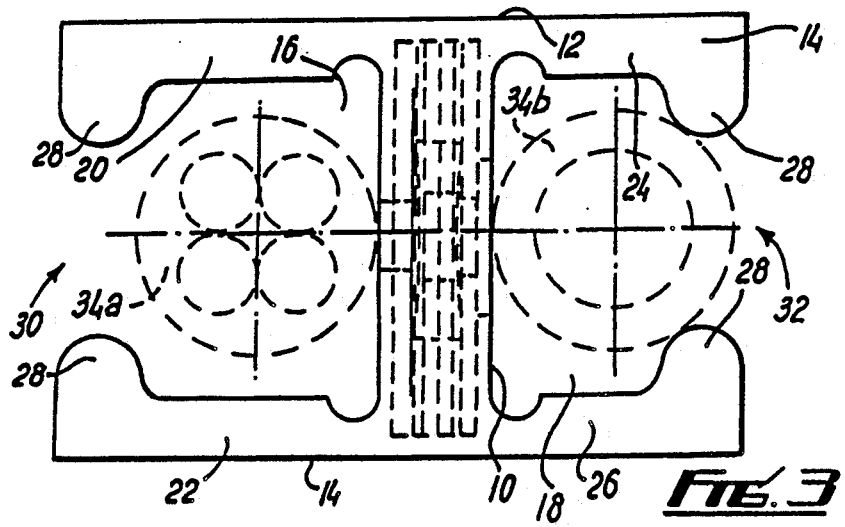
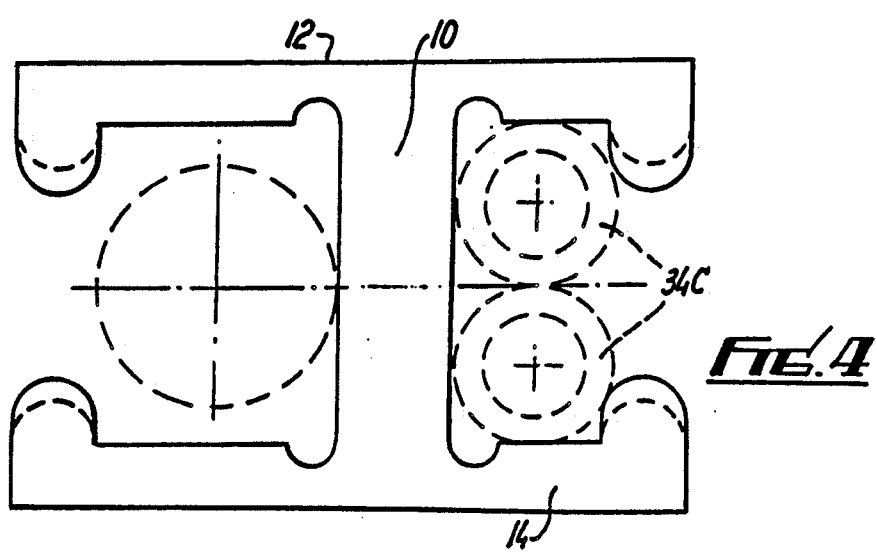
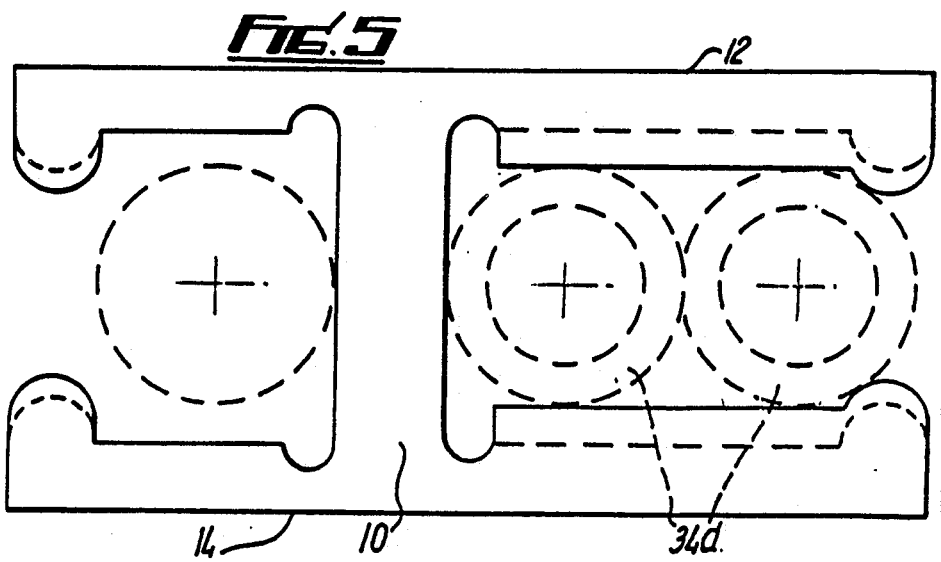

LINE PROTECTING APPARATUS

TECHNICAL FIELD

This invention relates to apparatus for protecting cables, service lines and the like (hereinafter referred to as "lines"), particularly but not exclusively in underground workings.

BACKGROUND ART

During mining operations it is necessary to protect a variety of electric cables, hoses or other service lines from damage, for example along gate roads leading to a coal face.

In one previously proposed design of line protector in the form of an articulated chain having links of channel configuration, a separate pin is provided to extend through apertures in legs of the channel in which the service lines are located. This is disadvantageous in that the separate pins can become detached and lost. It has also been proposed to use clips in the form of adjustable loops which are attached at one end to the channel for location of the service lines, the clips looping around the lines in the channel. Such an arrangement is disadvantageous as it is not easy to operate and gain the use of separate components can lead to detachment. Further, spring clips have been utilized which again are engageable through apertures in the links of the chain, but again such clips can become dislodged and have been found to be capable of damaging the service lines and interfering with other equipment parts. The problem is a serious one in that a high percentage of equipment problems occurring during mining operations have been found to arise due to malfunction of cable protectors resulting in damage to the service lines.

DISCLOSURE OF THE INVENTION

According to the present invention there is provided apparatus for protecting cables and service lines, said apparatus comprising means defining at least one open topped channel in which a line can locate, each side of the channel having a substantially planar outer surface which has a width towards a base of the channel and substantially the same width towards the entrance thereof to enable the line to locate in the channel substantially over the width of the channel sides, at least a first of the channel sides having means projecting inwardly of, and extending linearly substantially over the width of said first side to define with the opposed side of the channel an entrance to the channel of a width less than that of the channel, and less than the respective dimension of the line, and one channel side being resiliently movable, whereby to enable the line one or more lines of greater dimensions than the width of the channel entrance to be inserted through the channel entrance by outward movement of said one channel side latter by outward movement of said one channel side, to locate in the channel substantially over the width of the channel sides, and to be retained in the channel by the projecting means on return inward movement thereafter of said one channel side.

Preferably, the projecting means extends linearly substantially over the width of said first channel side, and the or each channel side is formed to be resiliently flexible.

Preferably also the inwardly projecting means comprises a formation formed on the free end of the or each channel side. The or each formation may be formed separately from the remainder of the or each respective channel side but is fixedly secured thereto, for example by ultrasonic welding, hot plate welding or adhesive. Alternatively each formation is formed integrally with the or each respective channel side.

The apparatus may be formed from a plastics material which is desirably annealed.

Advantageously, the apparatus includes two of the open topped channels on respective sides of a common web which thereby forms a common channel base. Preferably the web has a connection at each end to effectively form a link which is connectable to adjacent links and thereby forms an articulated arrangement.

The present invention also provides apparatus for protecting cables and service lines, said apparatus comprising means defining at least one open topped channel in which a line can locate, each side of the channel having a substantially planar outer surface which has a width towards a base of the channel and substantially the same width towards the entrance thereof to enable the line to locate in the channel substantially over the width of the channel sides, each channel side further having means projecting inwardly of, and extending linearly substantially over the width of the respective side to define with the opposed side of the channel an entrance to the channel of a width less than that of the channel, and less than the respective dimension of the line, and one channel side being resiliently movable, whereby to enable the line one or more lines of greater dimensions than the width of the channel entrance to be inserted through the channel entrance by outward movement of said latter by outward movement of said channel sides, to locate in the channel substantially over the width of the channel sides, and to be retained in the channel by the projecting means on return inward movement thereafter of said channel sides.

The invention may further provide an arrangement for handling cables and service lines, the arrangement comprising a plurality of line protecting components linked together, said plurality including at least one line protecting apparatus comprising means defining at least one open topped channel in which a line can locate, each side of the channel having a substantially planar outer surface which has a width towards a base of the channel and substantially the same width towards the entrance thereof to enable the line to locate in the channel substantially over the width of the channel sides, at least a first of the channel sides having means projecting inwardly of, and extending linearly substantially over the width of said first side to define with the opposed side of the channel an entrance to the channel of a width less than that of the channel, and less than the respective dimension of the line, and one channel side being resiliently movable, whereby to enable the line one or more lines of greater dimensions than the width of the channel entrance to be inserted through the channel entrance by outward movement of said one channel side latter by outward movement of said one channel side, to locate in the channel substantially over the width of the channel sides, and to be retained in the channel by the projecting means on return inward movement thereafter of said one channel side.

An embodiment of the present invention will now be described by way of example only, with reference to the accompanying drawings, in which:

BRIEF DESCRIPTION OF THE DRAWINGS

FIG. 3 is an end elevation of the apparatus of FIGS. 1 and 2;

FIG. 4 is an end elevation similar to FIG. 3 showing an alternative method of use;

FIG. 5 is an end elevation of a modified apparatus;

BEST MODE FOR CARRYING OUT THE INVENTION

Figure 1:
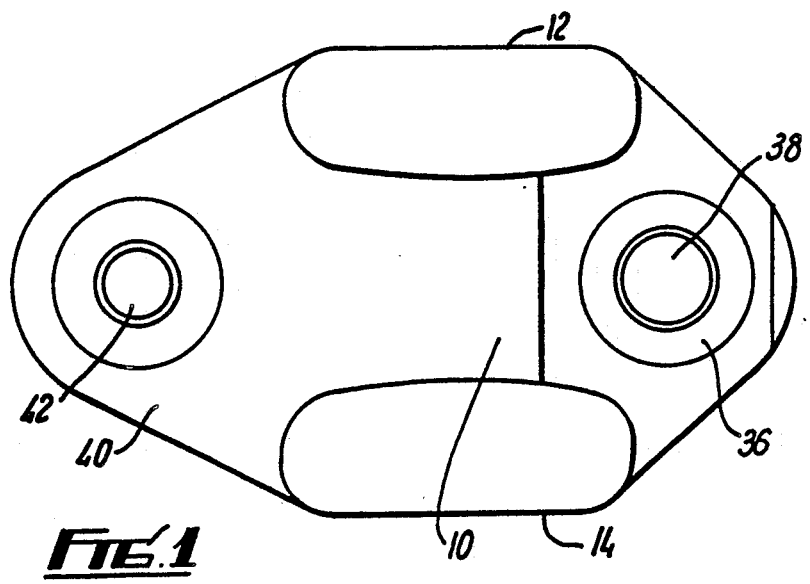
FIG. 1 is a side elevation of an apparatus of the invention; sectional
Figure 2A:
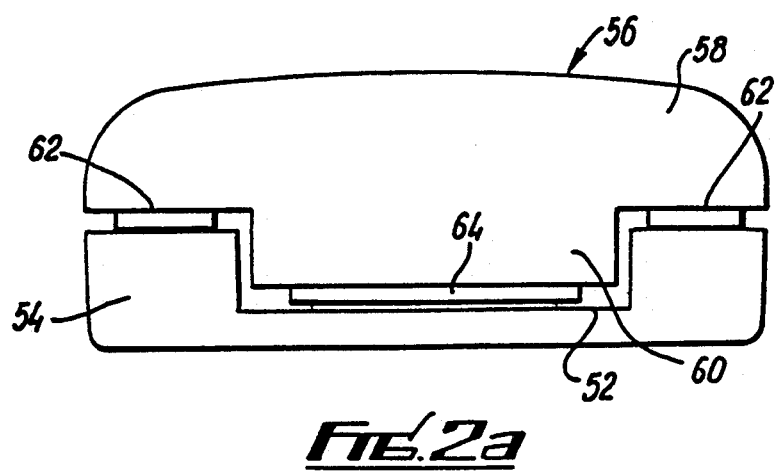
FIG. 2(a) is a detail view in elevation prior to a stage of manufacture.
Figure 2B:
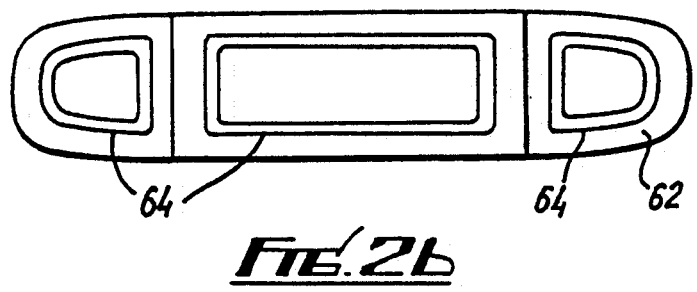
FIG. 2(b) is an underneath plan of part of the detail of FIG. 2(a)

Referring to FIGS. 1 to 3 of the drawings, a line protecting apparatus adapted to form a link of an articulated chain as hereinafter described, in preferably formed from a plastics material such as nylon. The apparatus has the form of a web 10 extending in use substantially vertically between upper and lower sides 12, 14, thereby defining laterally open channels 16, 18 on respective sides of a common base formed by the web 10. The sides 12, 14 form opposed legs 20, 22 of the channel 16 and opposed legs 24, 26 of the channel 18.

To enable the channel legs to be resiliently flexible, each of the legs 20-26 is partly relieved of material on its inner wall at the location of the web 10. Also each of the legs 20-26 has a formation in the form of a rounded bulge 28 formed to extend inwardly of the respective leg, thereby defining channel entrances 30, 32 of less width than the width of the respective channels 16, 18.

On a surface facing inwardly of the respective channel, each leg has a recessed central part 52 providing spaced side ribs 54 extending the length of the leg. Each of the bulges 28 comprises a component 56 formed from the same plastics material as the channels and having a first part 58 of a length substantially corresponding to the width of the channel legs, and a second part 60 projecting centrally from the part 58 and of a reduced length. The component 56 is adapted to be secured to the outer end of a respective one of the channel legs with the part 60 locating in an end cut-out in the recess 52 and shoulders 62 engaging the inwardly facing surfaces of the ribs 54. The surfaces of the component 56 to engage with the respective channel leg are each provided with a raised rib 64 whereby to provide sufficient spacing between the component 56 and the respective channel leg to enable securing of the component 56 for example by ultrasonic welding which melts the ribs 14. The component 56 may be secured to form an effective unitary structure with the respective channel leg by any other suitable means such as hot plate welding, adhesive or pinning. As an alternative the component may be secured by dovetail jointing.

In a preferred design the bulges 28 may be formed integrally with the channel legs, for example by moulding, but the moulds required would be relatively expensive. Moulding would require links with bulges separately and then securing the bulges to the channel legs, the one moulded link may be utilized with different sizes of bulges 28 for the different purposes as hereinafter described.

It is preferred that the plastics material of the link be annealed by insertion in a hot water bath whereby to improve the flexibility of the link.

When a line, e.g., a cable or service line, is to be inserted into a respective one of the channels 16, 18 the line is inserted into the channel entrance 30 (32) and, having a dimension greater than the width of the channel entrance, the line deflects the channel legs 20, 22, (24, 26) apart to locate in the respective channel 16 (18). After the line passes through the channel entrance, the channel legs 20, 22 (24, 26) regain their original position and prevent the line from moving inadvertently out of the channel 16 (18) through the channel entrance 30 (32). It will be appreciated that when the line is intended to be removed from the channel 16 (18), then the line can be used to forcible flex the channel legs 20, 22 (24, 26) outwardly and pass through the channel entrance 30 (32). The bulges 28 being rounded prevent snagging of the lines.

The web 10 is formed at one end as a projecting lug 36 having a through aperture 38 therein, while at the other end the web 10 is formed with a fork 40, the legs of which have respective aligned aperture 42. The link can thereby be connected to adjacent links when the lug of an adjacent link is located in the fork 40 and the lug 36 is located correspondingly in the form of an adjacent link. When respective apertures are aligned, suitable coupling pins can be used to connect the links together in an articulated manner, with links being interchangeable. Each of the apertures 38, 42 can be defined by a respective insert, preferably of steel, formed in the web 10. To avoid rust due to wet conditions below ground and the general environment, the steel inserts may be cadmium plated, and to prevent delaminating, each of the metal inserts may be chamfered around its periphery to allow the plastic of the web 10 to overlie the periphery and lock the insert in the plastic. Further the steel inserts may be provided with through holes to allow the plastics material to extend therethrough during moulding. As well as assisting location of the inserts, this helps annealing of the material. It is envisaged that in a chain formed by the connected links, each alternate link will require to be provided with bulges 28 on the channel legs, the bulges not requiring to be applied to each link of the chain. It should be appreciated however that the bulges 28 may be provided on links at different intervals if required and indeed it may be preferable for the chain, near to the location of a coal cutter, to have a number of adjacent links provided with the bulges 28.

The link of the invention is shown for use with a cable 34a and a hose 34b in respective channels in FIG. 3, but it is to be appreciated that different arrangements of cable or hose may be protected. For example as shown in FIG. 4, two smaller diameter hoses 34c may be located in the one channel.

In a modified arrangement as shown in FIG. 5, the height of one channel may be greater than the other whereby to retain two hoses 34d side by side in said one channel. It will be appreciated that channels may be formed of suitable dimensions to retain particular arrangements of cables and hoses.

Figure 6:
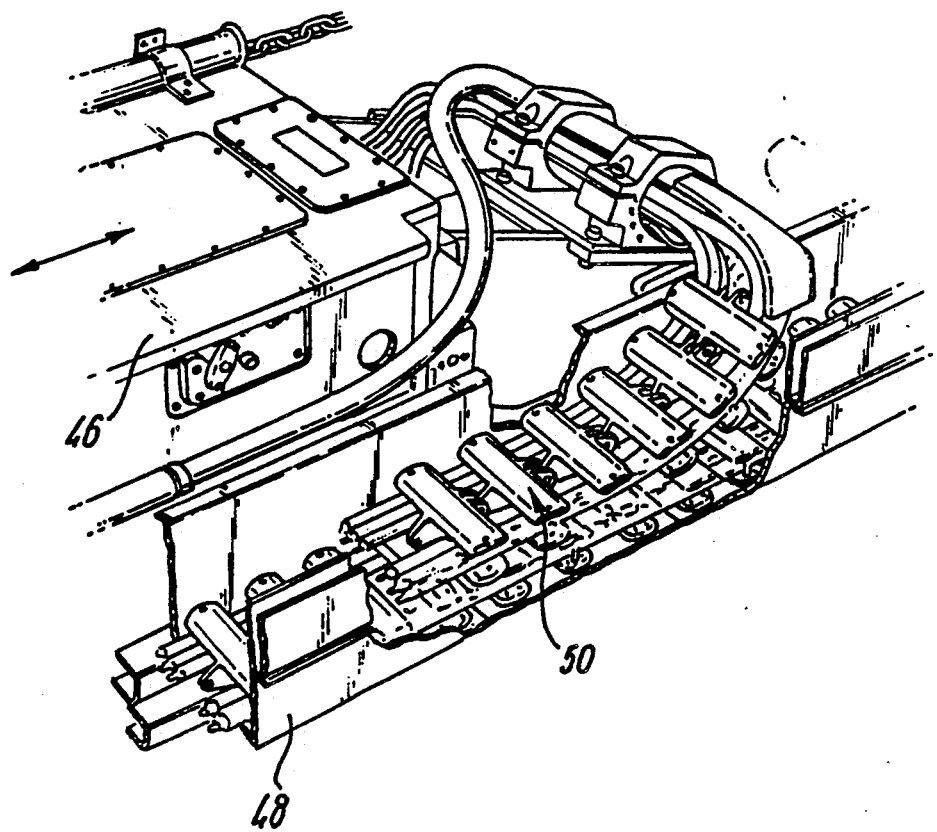
FIG. 6 is a schematic perspective view of an arrangement showing one use of the apparatus.
Figure 7:
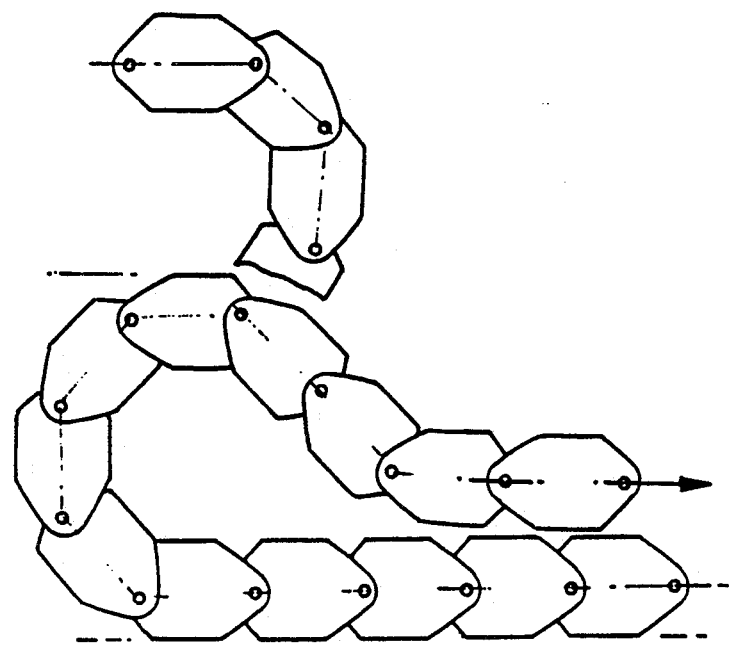
FIG. 7 is a diagrammatic illustration of the articulation in such an arrangement.

A chain formed by articulated links including the links described with reference to FIGS. 1 to 5 is particularly suitable for use in protecting cables and the like required to be connected to a coal cutter 46 (FIG. 6) operating along a coal face in longwall face mining. Such a coal cutter 46 has an associated armoured face conveyor providing a spill plate through 48 for locating the cables and the like. Movement of the cutter 46 back and forwards across the face results in looping and unlooping of sections of the protective chain 50 for the cables and the like. Articulation of the links, including the links of FIGS. 1 to 5, as schematically shown in FIG. 7, enables this looping and unlooping.

The invention thus provides an arrangement which can protect cables and service lines in underground workings and is particularly useful at the coal face for use with the coal cutter. The invention may have uses in other applications. Moulding of the chain links in a plastics material such as nylon can provide for both protection and retention of the service lines in the chain using the inherent flexing of the sections of the moulding, thereby avoiding any latching components and loose pieces.

Various modifications may be made without departing from the invention. For example inwardly projecting formations may be formed on only one leg of each channel provided the channel entrance width is as required. The actual configuration of the links and the construction of the web may differ from that described and shown.

I claim:

1. Apparatus for protecting cables and service lines, said apparatus comprising means defining at least one open topped channel in which a line can locate, each side of the channel having a substantially planar outer surface which has a width towards a base of the channel and substantially the same width towards the entrance thereof to enable the line to locate in the channel substantially over the width of the channel sides, at least a first of the channel sides having means projecting inwardly of, and extending linearly substantially over the width of said first side to define with the opposed side of the channel an entrance to the channel of a width less than that of the channel, and less than the respective dimension of the line, and one channel side being resiliently movable, whereby to enable the line to be inserted through the channel entrance by outward movement of said one channel side, and to be retained in the channel by the projecting means on return inward movement thereafter of said one channel side.

2. Apparatus according to claim 1, wherein said one channel side is formed to be resiliently flexible.

3. Apparatus according to claim 1, wherein the inwardly projecting means comprises a formation formed on a free end of said first channel side.

4. Apparatus according to claim 3, wherein the formation is formed separately from the remainder of said first channel side but is fixedly secured thereto.

5. Apparatus according to claim 4, wherein the formation is secured by ultrasonic welding.

6. Apparatus according to claim 4, wherein the formation is secured by adhesive.

7. Apparatus according to claim 4, wherein the formation is secured by hot plate welding.

8. Apparatus according to claim 3, wherein the formation is formed integrally with said first channel side.

9. Apparatus according to claim 3, wherein the formation has an inwardly facing surface which is rounded.

10. Apparatus according to claim 1, wherein the apparatus is formed from a plastics material.

11. Apparatus according to claim 10, wherein the plastics material is annealed.

12. Apparatus according to claim 6 wherein, to facilitate flexing, an inner wall of said one channel side at a base of the channel is partly relieved of material.

13. Apparatus according to claim 1, including two of the open topped channels on respective sides of a common web which thereby forms a common channel base.

14. Apparatus according to claim 13, wherein the web has a connection at each end to effectively form a link which is connectable to adjacent links and thereby forms an articulated arrangement.

15. Apparatus according to claim 14, wherein each connection comprises a strengthening insert providing a through aperture.

16. Apparatus according to claim 15, wherein the inserts are formed of cadmium plated steel.

17. Apparatus according to claim 1, wherein the channel defining means is formed as a moulded one-piece component.

18. Apparatus for protecting cables and service lines, said apparatus comprising means defining at least one open topped channel in which a line can locate, each side of the channel having a substantially planar outer surface which has a width towards a base of the channel and substantially the same width towards the entrance thereof to enable the line to locate in the channel substantially over the width of the channel sides, each channel side further having means projecting inwardly of, and extending linearly substantially over the width of the respective side to define with the opposed side of the channel an entrance to the channel of a width less than that of the channel, and less than the respective dimension of the line, and one channel side being resiliently movable, whereby to enable the line to be inserted through the channel entrance by outward movement of said channel sides, and to be retained in the channel by the projecting means on return inward movement thereafter of said channel sides.

19. Apparatus according to claim 18, wherein each channel side is formed to be resiliently flexible.

20. Apparatus according to claim 18, wherein the inwardly projecting means comprises a formation formed on a free end of each channel side.

21. Apparatus according to claim 20, wherein each formation is formed separately from the remainder of the respective channel side but is fixedly secured thereto.

22. Apparatus according to claim 21, wherein each formation is secured by ultrasonic welding.

23. Apparatus according to claim 21, wherein each formation is secured by adhesive.

24. Apparatus according to claim 21, wherein each formation is secured by hot plate welding.

25. Apparatus according to claim 18, wherein each formation is formed integrally with the respective channel side.

26. Apparatus according to claim 18, wherein each formation has an inwardly facing surface which is rounded.

27. An arrangement for handling cables and service lines, the arrangement comprising a plurality of line protecting components linked together, said plurality including at least one line protecting apparatus comprising means defining at least one open topped channel in which a line can locate, each side of the channel having a substantially planar outer surface which has a width towards a base of the channel and substantially the same width towards the entrance thereof to enable the line to locate in the channel substantially over the width of the channel sides, at least a first of the channel sides having means projecting inwardly of, and extending linearly substantially over the width of said first side to define with the opposed side of the channel an entrance to the channel of a width less than that of the channel, and less than the respective dimension of the line, and one channel side being resiliently movable, whereby to enable the line to be inserted through the channel entrance by outward movement of said one channel side, and to be retained in the channel by the projecting means on return inward movement thereafter of said one channel side.

28. An arrangement according to claim 28, wherein a plurality of the line protecting apparatus are provided in a predetermined relation with the other line protecting components. A

* * * * *